United States Patent
Marupaduga et al.

(10) Patent No.: US 11,284,467 B1
(45) Date of Patent: Mar. 22, 2022

(54) CONTROLLED TRANSITION OF UPLINK USER-PLANE IN DUAL-CONNECTIVITY SERVICE

(71) Applicant: Sprint Spectrum L.P., Overland Park, KS (US)

(72) Inventors: Sreekar Marupaduga, Overland Park, KS (US); Rajveen Narendran, Olathe, KS (US); Anurag Thantharate, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 202 days.

(21) Appl. No.: 16/740,948

(22) Filed: Jan. 13, 2020

(51) Int. Cl.
*H04W 92/10* (2009.01)
*H04W 76/20* (2018.01)
*H04W 76/16* (2018.01)
*H04W 36/00* (2009.01)

(52) U.S. Cl.
CPC ....... *H04W 76/20* (2018.02); *H04W 36/0044* (2013.01); *H04W 36/0058* (2018.08); *H04W 36/0061* (2013.01); *H04W 36/0069* (2018.08); *H04W 76/16* (2018.02); *H04W 92/10* (2013.01)

(58) Field of Classification Search
CPC ............. H04W 76/20; H04W 36/0061; H04W 36/0044; H04W 36/0058; H04W 36/0069; H04W 76/16; H04W 92/10
See application file for complete search history.

(56) References Cited

U.S. PATENT DOCUMENTS

2014/0369242 A1* 12/2014 Ng .......................... H04L 5/001
370/280
2021/0045173 A1* 2/2021 Takeda .............. H04W 72/0446

FOREIGN PATENT DOCUMENTS

WO    WO-2020103152 A1 *  5/2020 ............ H04W 76/15

\* cited by examiner

*Primary Examiner* — Jutai Kao (57) ABSTRACT

Dynamic reconfiguring of dual-connectivity service of a UE includes detecting that quality of the UE's second air-interface connection with a second access node is threshold poor and responsively reconfiguring the dual-connectivity service from (i) a first mode in which user plane communication of the dual-connectivity service is downlink on both the first and second air-interface connections and is uplink on the second air-interface connection but not on the first air-interface connection to (ii) a second mode in which the user-plane communication of the dual-connectivity service is downlink on both the first and second air-interface connections and is uplink on the first air-interface connection but not on the second air-interface connection.

20 Claims, 4 Drawing Sheets

CONTROLLED TRANSITION OF UPLINK USER-PLANE IN DUAL-CONNECTIVITY SERVICE

BACKGROUND

A cellular wireless network typically includes a number of access nodes that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated), can operate. Each access node could be coupled with a core network that provides connectivity with various application servers and/or transport networks, such as the public switched telephone network (PSTN) and/or the Internet for instance. With this arrangement, a UE within coverage of the cellular network could engage in air interface communication with an access node and could thereby communicate via the access node with various application servers and other entities.

Such a network could operate in accordance with a particular radio access technology (RAT), with communications from the access nodes to UEs defining a downlink or forward link and communications from the UEs to the access nodes defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each coverage area could operate on one or more radio-frequency (RF) carriers, each of which could be frequency division duplex (FDD), defining separate frequency channels for downlink and uplink communication, or time division duplex (TDD), with a single frequency channel multiplexed over time between downlink and uplink use.

On the downlink and uplink channels, the air interface on each carrier could be configured in a specific manner to define physical resources for carrying information wirelessly between the access node and UEs.

In a non-limiting example implementation, for instance, the air interface on each carrier could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval, the resource elements on the downlink and uplink of the example air interface could be grouped to define physical resource blocks (PRBs) that could be allocated as needed to carry data between the access node and served UEs.

In addition, certain resources on the downlink and/or uplink of each such carrier could be reserved for special purposes. For instance, on the downlink, certain resources could be reserved to carry synchronization signals that UEs could detect as an indication of coverage, other resources could be reserved to carry a reference signal that UEs could measure in order to determine coverage strength, still other resources could be reserved to carry other downlink control-plane signaling from the access node to UEs, and other resources could be reserved to carry scheduled user-plane communications from the access node to UEs. And on the uplink, certain resources could be reserved to carry uplink control-plane signaling from UEs to the access node, and other resources could be reserved to carry scheduled user-plane communications from UEs to the access node.

OVERVIEW

When a UE enters into coverage of an example network, the UE could detect threshold strong coverage of an access node on a particular carrier (e.g., a threshold strong reference signal broadcast by the access node on that carrier) and could then engage in random-access and connection signaling, such as Radio Resource Control (RRC) signaling, to establish an air-interface connection (e.g., RRC connection) through which the access node will then serve the UE on the carrier. Further, if the UE is not already registered for service with the core network, the UE could transmit to the access node an attach request, which the access node could forward to a core-network controller for processing. And the core-network controller and access node could then coordinate setup for the UE of one or more bearers extending between the UE and a core-network gateway that provides transport-network connectivity.

Once the UE is so connected and registered, the access node could then serve the UE in a connected mode over the air-interface connection, managing downlink air-interface communication of packet data to the UE and uplink air-interface communication of packet data from the UE.

For example, with the air interface described above, when packet data for the UE arrives at the core network from a transport network, the data could flow to the UE's serving access node, and the access node could then schedule and provide transmission of that data to the UE on particular downlink PRBs of the UE's air-interface connection. Likewise, when the UE has data to transmit on the transport network, the UE could transmit a scheduling request over the air-interface connection to the access node, the access node could responsively schedule transmission of that data from the UE on particular uplink PRBs of the air-interface connection, and the UE could accordingly transmit the data to the access node for forwarding through the core network to the transport network.

When the industry advances from one generation of wireless technology to the next, or in other scenarios, networks and UEs may also support dual-connectivity service, where a UE is served on co-existing connections according to multiple different RATs.

For instance, a cell site (or a combination of cell sites for that matter) could be equipped with a first access node that provides service according to a first RAT and a second access node that provides service according to a second RAT, and a UE positioned within coverage of the cell site could have a first radio configured to engage in service according to the first RAT and a second radio configured to engage in service according to the second RAT. With this arrangement, the UE may be able to establish a first air-interface connection with the first access node according to the first RAT and a second air-interface connection with the second access node according to the second RAT, and the access nodes may then concurrently serve the UE over those connections according to their respective RATs.

Such dual-connectivity (or "non-standalone" connectivity) could help facilitate increased peak data-rate of communications, by multiplexing the UE's communications across the multiple air-interface connections. Further or alternatively, dual-connectivity may provide other benefits compared with serving a UE on a single connection according to a single RAT (as "standalone" connectivity).

In a representative dual-connectivity implementation, a cell site's first-RAT access node could be responsible for coordinating setup and teardown of dual-connectivity service for the UE and could function as an anchor point for RRC signaling and core-network control signaling related to the dual-connected UE, and the cell site's second-RAT access node could function mainly to provide added connectivity and increased aggregate bandwidth for the UE.

When a UE that supports dual-connectivity service enters into coverage of such a cell site, the UE could initially scan for and detect coverage of the first access node on the first RAT and engage in signaling to establish a first air-interface connection between the UE and the first access node as discussed above.

In addition, perhaps having determined from profile data that the UE is dual-connectivity-capable, the first access node may then work with the core network, with the second access node, and with the UE, to establish a second air-interface connection between the UE and the second access node on the second-RAT and to configure bearer connectivity for the UE via the second access node.

With these first and second air-interface connections so established for the UE, the first and second access nodes could then serve the UE with packet-data communications on their respective connections with the UE, each in the manner discussed above, for instance with a portion of data flowing over the UE's first air-interface connection with the first access node concurrently with another portion of the data flowing over the UE's second air-interface connection with the second access node.

In a representative dual-connectivity implementation, however, while both the first and second access nodes may serve the UE with scheduled downlink user-plane communications, only one of the two access nodes may serve the UE with scheduled uplink user-plane communications. For instance, as an example default dual-connectivity configuration, the uplink user-plane communications may be set to occur on just the UE's second air-interface connection and thus not on the UE's first air-interface connection.

Thus, with the example configuration, when packet data for the UE arrives at the core network from a transport network, a portion of the data might flow ultimately to the first access node for scheduled transmission over the first air-interface connection to the UE and another portion of the data might flow ultimately to the second access node for scheduled transmission over the second air-interface connection to the UE. Whereas, when the UE has data to transmit on the transport network, the UE may transmit a scheduling request over the second air-interface connection to the second access node, the second access node could responsively schedule transmission of that data from the UE on particular uplink PRBs of the second air-interface connection, and the UE could accordingly transmit the data to the second access node on the second air-interface connection for forwarding through the core network to the transport network.

When a UE is served with dual-connectivity configured in this manner or the like, a technical problem that can arise is that quality of the UE's second air-interface connection may become poor, to the point that the UE may experience difficulty with scheduled uplink communication to the second access node. At the same time, however, it may be beneficial for the UE to retain its dual-connectivity to be able to receive scheduled downlink communications concurrently on both the first and second air-interface communications.

Recognizing this issue, the present disclosure provides for dynamically reconfiguring a UE's dual-connectivity service in response to detecting that quality of the UE's second air-interface connection is threshold poor.

In particular, upon detecting that quality of the UE's second air-interface connection is threshold poor, the first access node could dynamically reconfigure the dual-connectivity service from (i) a first mode in which the UE's scheduled downlink user-plane communication occurs on both the first and second air-interface connections and the UE's scheduled uplink communication occurs on the second air-interface connection but not on the first air-interface connection to (ii) a second mode in which the UE's scheduled downlink user-plane communication occurs on both the first and second air-interface connections and the UE's scheduled uplink communication occurs on the first air-interface connection but not on the second air-interface connection.

For instance, upon detecting that quality of the UE's second air-interface connection is threshold poor, the first access node could dynamically reconfigure the UE to transition the UE from (i) operating in a first mode in which the UE is set to transmit uplink scheduling requests over the second air-interface connection to the second access node instead of over the first air-interface connection to the first access node to (ii) operating in a second mode in which the UE is set to transmit uplink scheduling requests over the first air-interface connection to the first access node instead of over the second air-interface connection to the second access node.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of 4G LTE, 5G NR, and 4G-5G dual connectivity, referred to as EUTRA-NR Dual Connectivity (EN-DC). With EN-DC, a 4G access node (4G evolved Node-B (eNB)) functions as the first access node, and a 5G access node (5G next-generation Node-B (gNB)) functions as the second access node. Thus, a UE would first establish a standalone-4G connection with a 4G eNB, and the 4G eNB could then coordinate setup of EN-DC service for the UE, including setup for the UE of a secondary 5G connection with the 5G gNB. And the 4G eNB and 5G gNB could then concurrently serve the UE over their respective 4G and 5G connections with the UE.

It should be understood, however, that the principles disclosed herein could extend to apply with respect to other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways.

Figure 1:
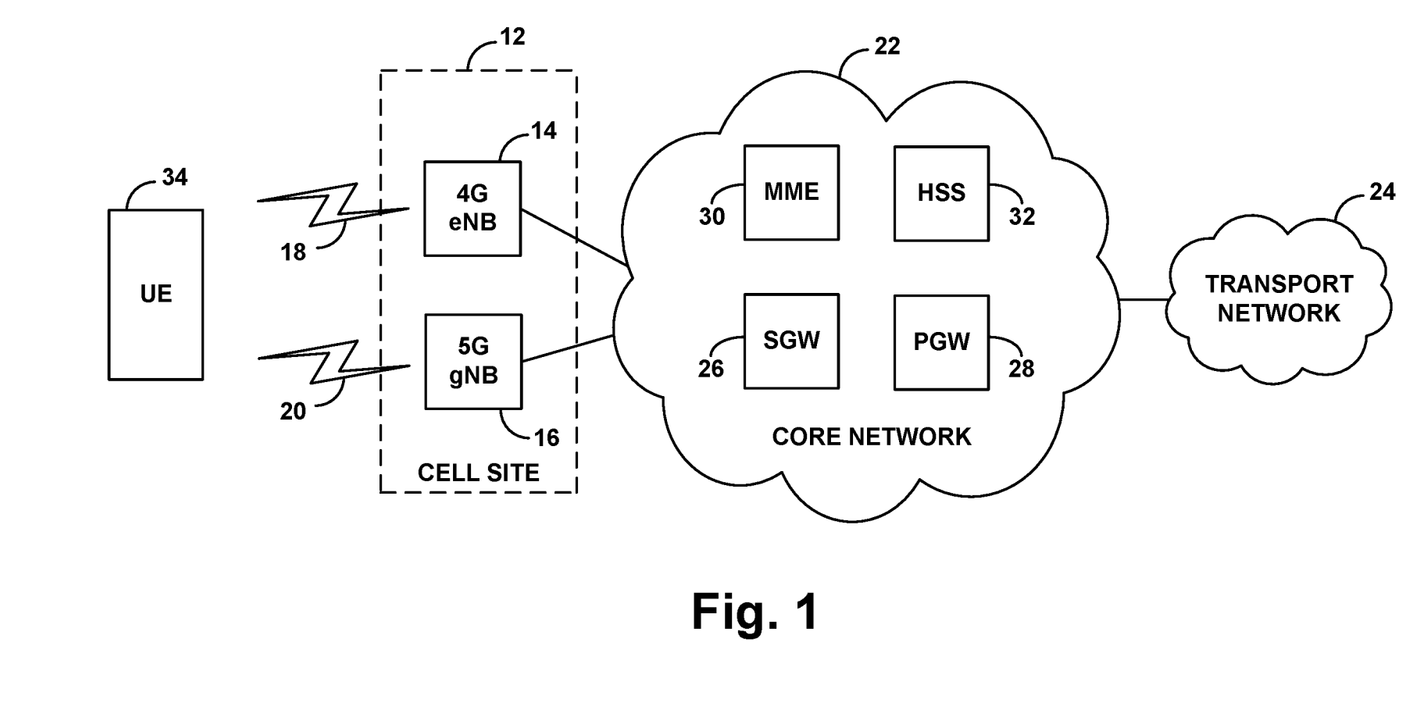
FIG. 1 is a simplified block diagram of an example network arrangement in which aspects of the present disclosure can be implemented.

FIG. 1 is a simplified block diagram of an example network arrangement having a cell site 12 that includes a 4G eNB 14 and a 5G gNB 16. These access nodes could be macro access nodes of the type configured to provide a wide range of coverage or could take other forms, such as small cell access nodes, repeaters, femtocell access nodes, or the like, possibly configured to provide a smaller range of coverage.

Each access node could have a respective and/or shared antenna structure that is configured to provide coverage and facilitate air-interface communication on one or more carriers according to a respective RAT. For instance, the 4G eNB 14 could provide 4G coverage 18 on one or more 4G carriers, and the 5G eNB 16 could provide 5G coverage 20 on one or more 5G carriers.

The 4G eNB 14 and 5G gNB 16 are each shown coupled with an example core network 22. Core network 22 could be an evolved packet core (EPC) network, a next generation core (NGC) network, or another network including components supporting an applicable radio access technology and providing connectivity with at least one transport network 24, such as the Internet.

In an example implementation as shown, the core network 22 includes a serving gateway (SGW) 26, a packet data network gateway (PGW) 28, a mobility management entity (MME) 30, and a home subscriber server (HSS) 32. With this arrangement, the SGW and PGW could cooperatively provide user-plane connectivity, to enable a UE served by an access node to engage in communication on the transport network. Further, the MME could operate as a core-network controller to carry out operations such as coordinating UE attachment and setup of user-plane bearers. And the HSS could store UE profile records, which could specify service-subscription plans, UE configurations, and/or other such UE capability information, such as whether a UE is EN-DC capable for instance.

As noted above, the air interface between each access node and UEs within its coverage could be structured to define various air-interface resources.

By way of example, in the time domain, the air interface could define a continuum of 10-millisecond (ms) frames, each divided into ten 1-ms subframes, and each subframe could be further divided into a number of timeslots, each additionally divided into symbol time segments. And in the frequency domain, the bandwidth of each carrier on which the access node operates could be divided into subcarriers with specified subcarrier spacing on the order of 15 to 240 kHz. With this example arrangement, the air interface on each carrier would define an array of resource elements each occupying a subcarrier and symbol time segment, and the access node and UEs could communicate with each other through modulation of the subcarriers to carry data in those resource elements. Variations of this arrangement are possible as well.

Further, particular sets of resource elements on the air interface could be grouped together to define the PRBs discussed above. In an example implementation, each PRB could span one timeslot in the time domain and a group of subcarriers in the frequency domain. Depending on the carrier bandwidth, the air interface could thus support a certain number of such PRBs across the bandwidth of the carrier within each timeslot.

In addition, certain resource elements on the downlink and uplink could be reserved for particular control-channel or shared-channel communications.

For instance, on the downlink, certain resource elements per subframe (or per downlink subframe in TDD) could be reserved to define a downlink control region for carrying control signaling such as scheduling directives and acknowledgements from the access node to UEs. And other resource elements per subframe could be reserved to define a shared channel in which PRBs could carry scheduled data communications from the access node to UEs.

Further, in certain subframes, a group of resource elements centered on the center frequency of each carrier could be reserved to carry synchronization signals that UEs could detect as a way to discover coverage of the access node on the carrier and to establish frame timing. And in certain subframes, a group of resource elements also centered on the center frequency of the carrier could be reserved to define a broadcast-channel for carrying system information messages, such as master information block (MIB) and system information block (SIB) messages that UEs could read to obtain operational parameters such as carrier bandwidth (e.g., downlink bandwidth and/or uplink bandwidth) and other information. Further, certain resource elements distributed in a predefined pattern throughout the carrier bandwidth per subframe could be reserved to carry reference signals that UEs could measure as a basis to evaluate coverage strength and quality and to provide channel estimates to facilitate precoding, beamforming, or the like.

On the uplink, on the other hand, certain resource elements per subframe (or per uplink subframe in TDD) could be reserved to define an uplink control region for carrying control signaling such as access requests, channel-quality reports, scheduling requests, and acknowledgements, from UEs to the access node. And other resource elements per subframe could be reserved to define a shared channel in which PRBs could carry scheduled data communications from UEs to the access node. Further, still other resources on the uplink could be reserved for other purposes as well, such as for carrying uplink reference signals or the like.

Note also that the 4G air interface and 4G service provided by the 4G eNB 14 on each 4G carrier could differ from the 5G air interface and 5G service provided by the 5G gNB 16 on each 5G carrier in various ways now known or later developed. For example, one may provide variable subcarrier spacing, but the other may provide fixed subcarrier spacing. As another example, one may have different symbol time segments than the other. As still another example, one may make use of different MIMO technologies than the other. And as yet another example, with TDD carriers, one may have a flexible TDD configuration and the other may have a fixed TDD configuration. Other examples are possible as well.

FIG. 1 also shows a representative UE 34 within coverage of both the 4G eNB 14 and the 5G gNB 16. UE 34 could be one of possibly many UEs in coverage of the cell site 12 at any given time.

In an example implementation, UE 34 supports 4G service, 5G service, and EN-DC service. For instance, the UE 34 could include a 4G radio and associated RF circuitry for engaging in 4G service over a connection with 4G eNB 14 and a 5G radio and associated RF circuitry for engaging in 5G service over a connection with 5G gNB 16, and the UE 34 could include control logic to enable the UE to engage in EN-DC service, operating concurrently with a 4G connection and a 5G connection.

When UE 34 enters into coverage of the 4G eNB 14, the UE could detect coverage of the 4G eNB on a 4G carrier, and the UE could determine coverage strength from the 4G eNB on that carrier, such as reference signal receive strength (RSRP) or reference signal receive quality (RSRQ), among other possibilities. If the UE determines that that coverage is sufficiently strong, the UE could then engage in random access signaling and RRC configuration signaling with the 4G eNB as discussed above to establish a 4G connection with the 4G eNB on the carrier, thus putting the UE in an RRC-connected mode. Further, the 4G eNB could establish in data storage a context record for the UE and could store in the context record an identification of the UE's established 4G connection and an identification of the 4G carrier on which the UE is connected with the 4G eNB.

In addition, once the UE is connected with the 4G eNB, the UE could then transmit to the 4G eNB an attach request if appropriate, which the 4G eNB could forward to the MME for processing as discussed above. And after authenticating the UE, the MME could coordinate setup for the UE of one or more user-plane bearers. For instance, for each such bearer, the MME could engage in signaling with the 4G eNB and the SGW to set up for the UE an S1-U tunnel between the 4G eNB and the SGW, the SGW could responsively engage in signaling with the PGW to set up for the UE an S5 tunnel between the SGW and the PGW, and the 4G eNB could engage in signaling with the UE to set up for the UE a data radio bearer (DRB) between the UE and the eNB. Further, the 4G eNB could record the operational state of the UE in the UE context record.

In relation to this attachment process or at another time, the 4G eNB could also obtain capabilities data regarding the UE and could store the capabilities data in the UE context record for reference while serving the UE. For instance, during the attachment process, the MME could obtain this data from the HSS and could covey the data to the 4G eNB for storage. Alternatively or additionally, the UE could provide the 4G eNB with a capabilities-report that conveys this data to the 4G eNB for storage.

Once the UE is so connected with the 4G eNB, the 4G eNB could then provide the UE with data communication service on the UE's 4G connection as discussed above.

For instance, when data arrives at the 4G eNB for transmission to the UE, the 4G eNB could allocate one or more downlink PRBs in a subframe on the 4G connection for use to transmit at least a portion of the data, defining a transport block, to the UE. The 4G eNB could then transmit to the UE in the control region of that subframe on the 4G connection a Downlink Control Information (DCI) message that designates the PRBs, and the 4G eNB could accordingly transmit the transport block to the UE in those designated PRBs on the 4G connection.

And when the UE has data to transmit to the 4G eNB (e.g., for transmission on the transport network), the UE could transmit to the 4G eNB on an uplink control channel (e.g., on a physical uplink control channel (PUCCH)) of the 4G connection a scheduling request that carries with it a buffer status report (BSR) indicating how much data the UE has buffered for transmission. And in response, the 4G eNB could allocate one or more uplink PRBs in an upcoming subframe on the 4G connection for carrying a transport block of that data from the UE and could transmit to the UE on the 4G connection a DCI message that designates those upcoming PRBs. The UE could then accordingly transmit the transport block to the 4G eNB in the designated PRBs on the 4G connection.

Note also that the 4G eNB may serve multiple UEs at once on each carrier on which the 4G eNB provides service. To facilitate this, the 4G eNB could apply a scheduling algorithm in an effort to fairly allocate the PRBs of each such carrier for use by the various served UEs, taking into account a variety of factors such as UE subscription-service level, type of service, and the like. Thus, when UE 34 is connected with and served by the 4G eNB on a given carrier, the 4G eNB may be serving one or more other UEs at the same time on that carrier.

Further, in response to one or more trigger conditions, such as a desire to provide the UE with higher peak data rate of communications, and given the UE's support for EN-DC service, the 4G eNB could also work to coordinate setup for the UE of EN-DC service.

The process of coordinating setup of EN-DC service for the UE could take various forms. For example, the process could involve signaling over an inter-access-node interface (e.g., an X2 interface) with the 5G eNB 16, and signaling with the UE to coordinate setup of a 5G connection between the UE and the 5G eNB on a 5G carrier. Further, for each of one or more user-plane bearers established for the UE, the process could involve working with the 5G gNB and perhaps with the MME, to coordinate setup for the UE of a split bearer so that a portion of the UE's user-plane communications could be served by the 4G eNB and another portion of the UE's user-plane communications could be served by the 5G gNB. This split bearer could be configured in various ways, such as (i) at the SGW, with one leg extending between the SGW and the 4G eNB and another leg extending between the SGW and the 5G gNB, (ii) at the 4G eNB, with the UE's 5G communications passing over an interface between the 4G and 5G access nodes, or (iii) at the 5G gNB, with the UE's 4G communications passing over an interface between the 4G and 5G access nodes.

In line with the discussion above, in a representative EN-DC implementation, the UE could be set to engage in scheduled downlink user-plane communication on both its 4G connection and its 5G connection, but the UE would be set to engage in scheduled uplink user-plane communication on just one of those two connections. For instance, in an example default configuration, the UE would be set to engage in scheduled uplink user-plane communication on just its 5G connection and thus not on its 4G connection.

Accordingly, in an example implementation, when the core network has data to transmit to the UE, a portion of that data may flow ultimately to the 4G eNB 14, and the 4G eNB 14 may schedule and provide transmission of that data to the UE on PRBs of the UE's 4G connection, and another portion of that data may flow ultimately to the 5G gNB 16, and the 5G gNB 16 may likewise schedule and provide transmission of that data to the UE on PRBs of the UE's 5G connection. But when the UE has data to transmit, the UE may by default arrange for uplink transmission of that data on the UE's 5G connection rather than on the UE's 4G connection. Thus, the UE may transmit over its 5G connection to the 5G gNB 16 a scheduling request, the 5G gNB 16 may transmit over the 5G connection to the UE a DCI message allocating one or more uplink PRBs of the 5G connection to carry the UE's uplink transmission, and the UE may accordingly transmit the data to the 5G gNB on the allocated PRBs of the 5G connection. Note that in this state of operation, the UE's scheduled uplink user-plane communication would flow on just the UE's 5G connection and thus not on the UE's 4G connection. But there may be some uplink communication from the UE to the 4G eNB 14 on the UE's 4G connection. For instance, on the 4G connection, the UE may still engage in uplink RRC control signaling with the 4G eNB to manage the UE's connections. And on the 4G connection, the UE may still transmit acknowledgement messaging (e.g., ACK and NACK) messaging regarding scheduled downlink user-plane communications from the 4G eNB 14, among possibly other examples.

In accordance with the present disclosure as noted above, while the UE is so served with EN-DC by the 4G eNB 14 and the 5G gNB 16, the 4G eNB might detect that quality of the UE's 5G connection is threshold poor. And in response, the 4G eNB may take action to transfer the UE's user-plane uplink from the UE's 5G connection to the UE's 4G connection, while retaining both the 4G connection and 5G connection for use to carry scheduled downlink user-plane communications to the UE.

As a trigger for switching the UE's user-plane uplink from the UE's 5G connection to the UE's 4G connection, the 4G eNB could detect the threshold poor quality of the UE's 5G connection in various ways, considering downlink quality and/or uplink quality. Further, quality could evaluated according to one or more metrics, such signal strength, signal-to-noise ratio, extent of retransmissions, noise level, packet error rate, block error rate, bit error rate, power headroom, and/or others now known or later developed.

As to the 5G downlink, for example, the UE might be configured to monitor quality of the UE's 5G connection on the downlink and to report results of that monitoring, and the 4G eNB might be configured to receive and evaluate those reports or associated data.

For example, as the 5G gNB serves the UE, the UE might regularly provide the 5G gNB with channel quality indicator (CQI) reports and/or reference signal evaluations that represent determined downlink quality of the UE's 5G connection. And the 5G gNB might forward those reports or associated representative data over an inter-access-node interface (e.g., an X2 interface) to the 4G eNB. The 4G eNB could thus evaluate such data as a basis to detect that quality of the UE's 5G connection is threshold poor. For example, the 4G eNB could thereby detect that quality of the UE's 5G connection is threshold poor based at least on determining that the UE has reported lower than a predefined level of CQI, RSRP, RSRQ, or the like, possibly over a recent sliding window of time.

In a specific example implementation, for instance, the 4G eNB may transmit to the UE a special measurement object that defines a downlink threshold quality threshold for triggering UE reporting to the 4G eNB of poor 5G-connection quality. This threshold might be a certain decibel-milliwatt (dBm) measure, perhaps somewhat higher than a threshold that would be used as a trigger for tearing down the 5G connection entirely. Thus, when the UE detects that RSRP or the like of the UE's 5G connection is at least as low as that defined threshold, the UE could report that fact in a measurement report over the 4G connection to the 4G eNB. And the 4G eNB could thereby detect that quality of the UE's 5G connection is threshold poor based at least on receipt of that report from the UE.

As another example, for scheduled downlink user-plane communications to the UE on the 5G connection, the UE may regularly transmit acknowledgement messages such as ACK and NACK messages over the 5G connection to the 5G gNB, and the 5G gNB may retransmit to the UE when appropriate in view of failed transmission attempts. As another metric of downlink 5G-connection quality, the 5G gNB and/or UE could also report to the 4G eNB an extent of such downlink 5G retransmissions. Thus, for instance, the 4G eNB might detect that quality of the UE's 5G connection is threshold poor based at least on determining that the extent of downlink 5G retransmissions to the UE has been higher than a predefined, likewise possibly over a recent sliding window of time.

As to the 5G uplink, on the other hand, the 5G gNB might be configured to monitor quality of the UE's 5G connection on the uplink and to report results of that monitoring to the 4G eNB for evaluation.

Here, for instance, the 5G gNB might consider uplink receive signal strength of the UE's transmissions to the 5G gNB on the UE's 5G connection. Alternatively or additionally, the 5G gNB might consider an overall level of uplink noise on the carrier(s) on which the UE's 5G connection is defined (perhaps measured bandwidth wide)—as a noise floor on top of which the UE's schedule uplink user-plane communications would flow to the 5G gNB. And still alternatively or additionally, the 5G gNB might consider other uplink quality metrics. The 5G gNB might report any or all of this or other such data to the 4G eNB. And thus, the 4G eNB might detect that quality of the UE's 5G connection is threshold poor based at least on determining that the one or more such uplink metrics represents uplink quality of the 5G connection that is lower than a predefined threshold, perhaps over a sliding window of time.

And here analogously, for scheduled uplink user-plane communications from the UE on the 5G connection, the 5G gNB may regularly transmit acknowledgement messages such as ACK and NACK messages over the 5G connection to the UE, and the UE may retransmit to the 5G gNB when appropriate in view of failed transmission attempts. So another metric of downlink 5G-connection quality, the 5G gNB and/or UE could also report to the 4G eNB an extent of such uplink 5G retransmissions. Thus, for instance, the 4G eNB might detect that quality of the UE's 5G connection is threshold poor based at least on determining that the extent of uplink 5G retransmissions from the UE has been higher than a predefined, again possibly over a recent sliding window of time.

Other channel-quality metrics could be considered as well. Further, the 4G eNB could detect in other ways that quality of the UE's 5G connection is threshold poor. For instance, one or more other entities could make the determination and could directly or indirectly inform the 4G eNB, so that the 4G eNB could detect that quality of the UE's 5G connection is threshold poor by being so informed.

Upon detecting that quality of the UE's 5G connection is threshold poor, the 4G eNB could then take action to transfer the UE's user-plane uplink from the UE's 5G connection to the UE's 4G connection while retaining both connections for downlink user-plane communication. In practice, for instance, the 4G eNB could engage in RRC signaling with the UE to direct and thus cause the UE switch from (i) a first mode in which the UE is set to send uplink scheduling requests over the UE's 5G connection to the 5G gNB to (ii) a second mode in which the UE is instead set to send uplink scheduling requests over the UE's 4G connection to the 4G eNB.

Here, for instance, the UE could include control logic according to which, when the UE has EN-DC configured and the UE has data to transmit, the UE would normally send an uplink scheduling request over the UE's 5G connection to the 5G gNB, to cause the 5G gNB to schedule uplink transmission of that data on the 5G connection from the UE to the 5G gNB. Per the present disclosure, however, that control logic could also be configured such that, when the UE receives from its serving 4G eNB an RRC connection-configuration message that directs the UE to switch the UE's user-plane uplink to the 5G connection, the UE would responsively reconfigure itself such that, when the UE has data to transmit, the UE would then instead send an uplink scheduling request over the UE's 4G connection to the 4G eNB, to cause the 4Rg eNB to schedule uplink transmission of the data on the 4G connection from the UE to the 4G eNB.

Further, if appropriate to facilitate handling of any split-bearer arrangement or the like, and/or for other reasons, the 4G may also engage in signaling with the 5G gNB and/or with the MME or one or more other entities, to further facilitate having the UE's uplink user-plane communications flow over the UE's 4G connection rather than over the UE's 5G connection.

For instance, with the default EN-DC configuration, uplink user-plane communications from the UE might have flowed over the UE's 5G connection from the UE to the 5G gNB and then over an access bearer from the 5G gNB to the SGW. With the UE's uplink switched to be anchored at the 4G eNB instead, uplink user-plane communications may instead flow over the UE's 4G connection to the 4G eNB and then over an X2 interface from the 4G eNB to the 5G gNB and over the access bearer from the 5G gNB to the SGW. To facilitate this, the 4G eNB might signal to the 5G gNB to prepare the 5G gNB to receive the UE's uplink communications over the X2 interface for forwarding from the 5G gNB to the SGW.

Figure 2:
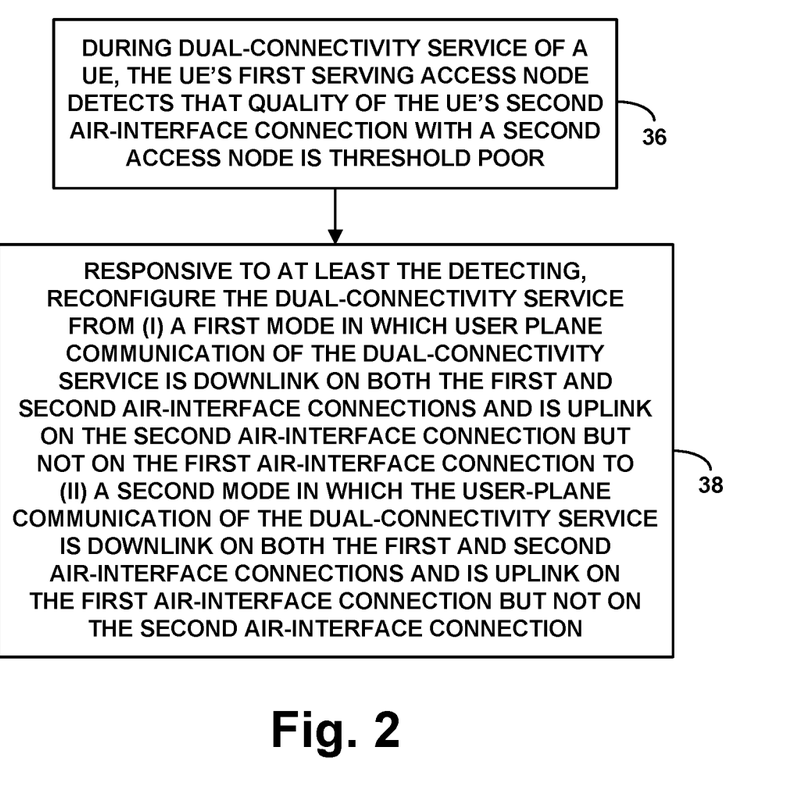
FIG. 2 is a flow chart depicting an example method in accordance with the disclosure.

FIG. 2 is next a flow chart depicting a method that can be carried out in accordance with the present disclosure to dynamically reconfigure dual-connectivity service of a UE, in a scenario where the dual-connectivity service of the UE includes a first access node serving the UE over a first air-interface connection between the first access node and the UE concurrently with a second access node serving the UE over a second air-interface connection between the second access node and the UE. This method could be carried out by or on behalf of the first access node, among other possibilities.

As shown in FIG. 2, at block 36, the method includes, during the dual-connectivity service (e.g., while the UE has the dual-connectivity service configured and is in a state where the UE is being served by both access nodes concurrently), the first access node detecting that quality of the second air-interface connection between the second access node and the UE is threshold poor. Further, at block 38, the method includes, responsive to at least the detecting (i.e., due to at least the detecting), reconfiguring the dual-connectivity service from (i) a first mode in which user plane communication of the dual-connectivity service is downlink on both the first and second air-interface connections and is uplink on the second air-interface connection but not on the first air-interface connection to (ii) a second mode in which the user-plane communication of the dual-connectivity service is downlink on both the first and second air-interface connections and is uplink on the first air-interface connection but not on the second air-interface connection.

In line with the discussion above, the act of detecting that the quality of the second air-interface connection between the second access node and the UE is threshold poor could involve detecting that downlink quality of the second air-interface connection between the second access node and the UE is threshold poor. For instance, this could be based on one or more factors such as (i) a report from the UE of channel quality of the second air-interface connection and/or (ii) a quantity of retransmission requests for downlink transmission over the second air-interface connection from the second access node to the UE, among other possibilities.

Alternatively or additionally, the act of detecting that the quality of the second air-interface connection between the second access node and the UE is threshold poor could involve detecting that uplink quality of the second air-interface connection between the second access node and the UE is threshold poor. For instance, this could be based on one or more factors such as (i) evaluation of uplink receive signal quality for transmission from the UE to the second access node on the second air-interface connection, (ii) a quantity of retransmission requests for uplink transmission over the second air-interface connection from the UE to the second access node and/or (iii) uplink noise on a carrier on which the second air-interface connection is defined. Further, the act of detecting that the quality of the second air-interface connection between the second access node and the UE is threshold poor could involve the first access node receiving from the second access node, over an inter-access-node interface, an indication of the threshold poor quality of the second air-interface connection.

As further discussed above, the act of reconfiguring the dual-connectivity service of the UE could involve reconfiguring the UE from (i) being set to transmit uplink scheduling requests over the second air-interface connection to the second access node to instead (ii) being set to transmit uplink scheduling requests over the first air-interface connection to the first access node. For instance, the reconfiguring of the UE could involve transmitting from the first access node to the UE, over the first air-interface connection, a reconfiguration directive to which the UE is configured to respond by transitioning from (i) being set to transmit uplink scheduling requests over the second air-interface connection to the second access node to (ii) being set to transmit uplink scheduling requests over the first air-interface connection to the first access node.

In addition, in an example implementation, the process of reconfiguring the dual-connectivity service to move the UE's user-plane uplink to the first air-interface connection could be conditioned on a determination that three is threshold low uplink load on at least one carrier on which the UE's first air-interface connection is defined. Here, for instance, the first access node might regularly evaluate uplink load on such a carrier, perhaps as a measure of PRB-utilization or the like on the carrier. And the first access node might monitor to determine whether that load is at least as high as a threshold level. In this example implementation, if and only if the first access node determines that the uplink load on the carrier is not at least as high as the threshold level, then the first access node may proceed to possibly reconfigure the UE's dual-connectivity service as described above.

Figure 3:
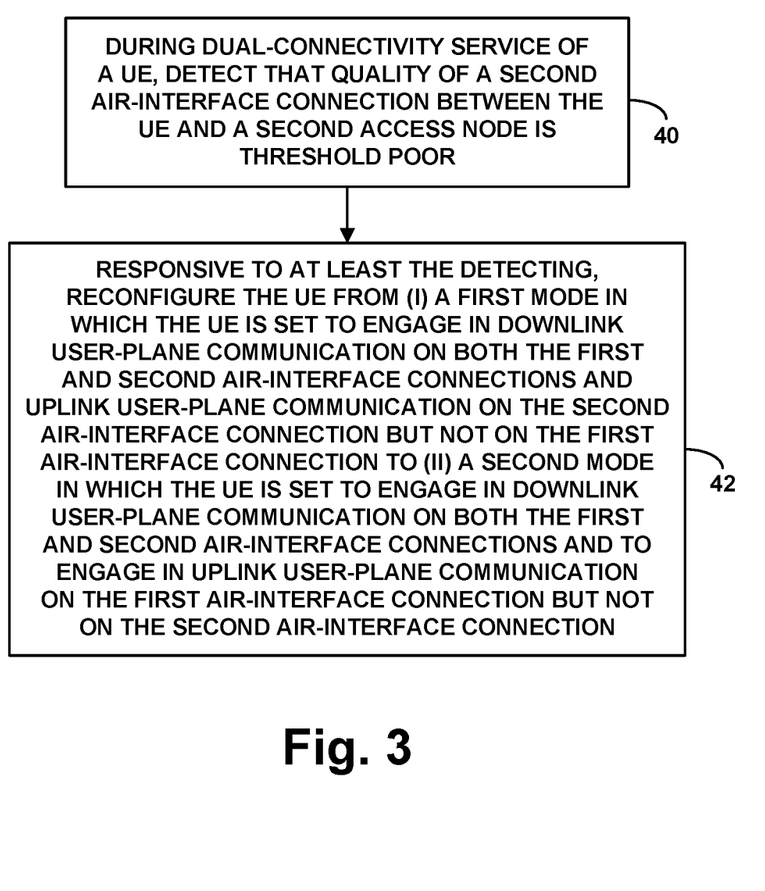
FIG. 3 is another flow chart depicting an example method in accordance with the disclosure.

FIG. 3 is next a flow chart depicting a method that can be carried out in accordance with the present disclosure to dynamically control dual-connectivity service of a UE in which the UE is served concurrently by a first access node over a first air-interface connection between the UE and the first access node and by a second access node over a second air-interface connection between the UE and the second access node. This method too could be carried out by or on behalf of the first access node, among other possibilities.

As shown in FIG. 3, at block 40, the method includes, during the dual-connectivity service, detecting that quality of the second air-interface connection between the UE and the second access node is threshold poor. And at block 42, the method includes, responsive to at least the detecting, reconfiguring the UE from (i) a first mode in which the UE is set to engage in downlink user-plane communication on both the first and second air-interface connections and uplink user-plane communication on the second air-interface connection but not on the first air-interface connection to (ii) a second mode in which the UE is set to engage in downlink user-plane communication on both the first and second air-interface connections and to engage in uplink user-plane communication on the first air-interface connection but not on the second air-interface connection.

Various features described above can be implemented in this context as well, and vice versa.

For example, the act of detecting that the quality of the second air-interface connection between the UE and the second access node is threshold poor could involve downlink and/or uplink evaluation, considering one or more metrics such as but not limited to those noted above.

Further, in the first mode, the UE could be set to transmit uplink scheduling requests over the second air-interface connection to the second access node instead of over the first air-interface connection to the first access node, whereas in the second mode, the UE could be set to transmit uplink scheduling requests over the first air-interface connection to the first access node instead of over the second air-interface connection to the second access node. And the act of reconfiguring the UE responsive to at least the detecting could involve transmitting from the first access node to the UE over the first air-interface connection a reconfiguration directive to which the UE is configured to respond by transitioning from the first mode to the second mode.

Figure 4:
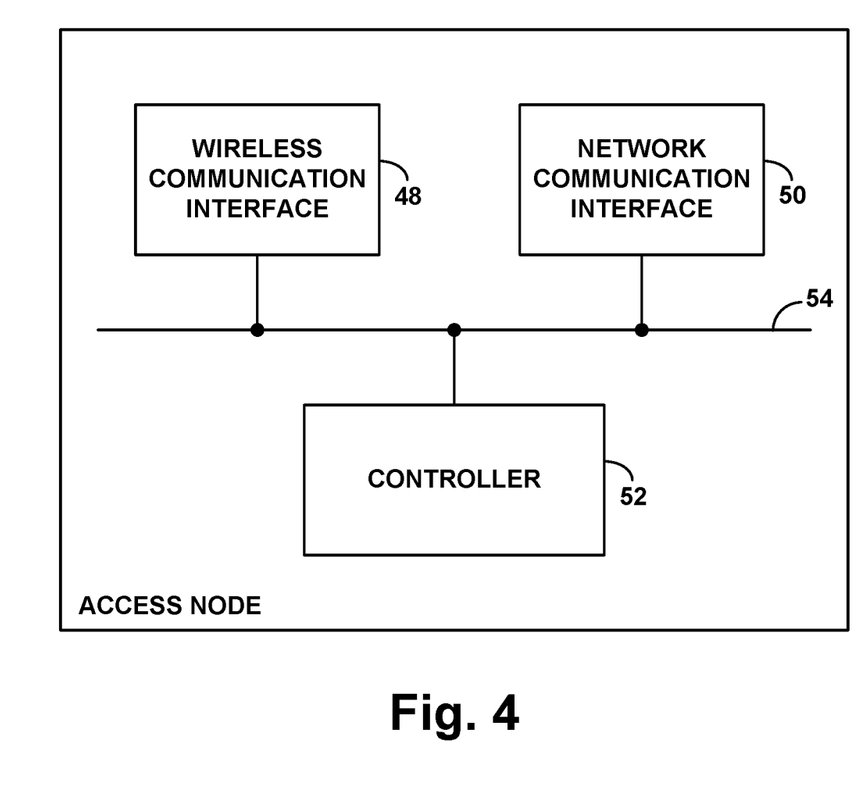
FIG. 4 is a simplified block diagram of an example access node operable in accordance with the disclosure.

Finally, FIG. 4 is a simplified block diagram of an example first access node, such as 4G eNB 14, showing some of the components that could be included in the access node in a non-limiting example implementation. As shown, the example first access node includes a wireless communication interface 48, a backhaul communication interface 50, and a controller 52, which could be integrated together in various ways (e.g., on a chipset) and/or interconnected by a system bus, network, or other communication mechanism 54 as shown.

The wireless communication interface 48 could include a radio and antenna structure through which the first access node could be configured to engage in air-interface communication and serve UEs according to a first RAT. And the backhaul communication interface 50 could comprise a wired or wireless network communication module, such as an Ethernet interface, through which to communicate with other entities, perhaps with the second access node and/or with one or more other entities on or via a core network.

Further, the controller 52 could comprise a processing unit (e.g., one or more processing units such as microprocessors and/or specialized processors), non-transitory data storage (e.g., one or more volatile and/or non-volatile storage components, such as magnetic, optical, or flash storage), and program instructions stored in the data storage and executable by the processing unit to carry out, or cause the first access node to carry out, various operations as described herein.

Various features discussed above can be implemented in this context as well, and vice versa.

The present disclosure also contemplates a non-transitory computer-readable medium having encoded thereon (e.g., storing, embodying, containing, or otherwise incorporating) program instructions executable to cause a processing unit to carry out operations such as those described above.

Further, while the foregoing focuses on dual connectivity defined as involving service concurrently on two or more different RATs, the features described could extend as well to apply with respect to a single RAT, such as where a UE is connected with a first access node under a given RAT and at issue is adding for the UE of a second connection under the same RAT with a second access node to facilitate having the UE be served concurrently by both access nodes under that RAT.

Exemplary embodiments have been described above. Those skilled in the art will understand, however, that changes and modifications may be made to these embodiments without departing from the true scope and spirit of the invention.

We claim:

1. A method of dynamically reconfiguring dual-connectivity service of a user equipment device (UE), wherein the dual-connectivity service of the UE includes a first access node serving the UE over a first air-interface connection between the first access node and the UE concurrently with a second access node serving the UE over a second air-interface connection between the second access node and the UE, the method comprising:

during the dual-connectivity service, detecting by the first access node that quality of the second air-interface connection between the second access node and the UE is less than or equal to a predefined quality threshold; and responsive to at least the detecting, reconfiguring the dual-connectivity service from (i) a first mode in which user plane communication of the dual-connectivity service is downlink on both the first and second air-interface connections and is uplink on the second air-interface connection but not on the first air-interface connection to (ii) a second mode in which the user-plane communication of the dual-connectivity service is downlink on both the first and second air-interface connections and is uplink on the first air-interface connection but not on the second air-interface connection.

2. The method of claim 1, wherein detecting that the quality of the second air-interface connection between the second access node and the UE is less than or equal to the predefined quality threshold comprises detecting that downlink quality of the second air-interface connection between the second access node and the UE is less than or equal to a predefined downlink quality threshold.

3. The method of claim 2, wherein detecting that the downlink quality of the second air-interface connection between the second access node and the UE is less than or equal to the predefined downlink quality threshold is based on at least one factor selected from the group consisting of (i) a report from the UE of channel quality of the second air-interface connection and (ii) a quantity of retransmission requests for downlink transmission over the second air-interface connection from the second access node to the UE.

4. The method of claim 1, wherein detecting that the quality of the second air-interface connection between the second access node and the UE is less than or equal to the predefined quality threshold comprises detecting that uplink quality of the second air-interface connection between the second access node and the UE is less than or equal to a predefined uplink quality threshold.

5. The method of claim 4, wherein detecting that the uplink quality of the second air-interface connection between the second access node and the UE is less than or equal to the predefined uplink quality threshold is based on at least one factor selected from the group consisting of (i) evaluation of uplink receive signal quality for transmission from the UE to the second access node on the second air-interface connection, (ii) a quantity of retransmission requests for uplink transmission over the second air-interface connection from the UE to the second access node, and (iii) uplink noise on a carrier on which the second air-interface connection is defined.

6. The method of claim 1, wherein detecting by the first access node that the quality of the second air-interface connection between the second access node and the UE is less than or equal to the predefined quality threshold comprises receiving by the first access node from the second access node, over an inter-access-node interface, an indication of the quality of the second air-interface connection.

7. The method of claim 1, wherein reconfiguring of the dual-connectivity service comprises reconfiguring the UE from being set to transmit uplink scheduling requests over the second air-interface connection to the second access node to instead being set to transmit uplink scheduling requests over the first air-interface connection to the first access node.

8. The method of claim 7, wherein reconfiguring the UE comprises transmitting from the first access node to the UE over the first air-interface connection a reconfiguration directive to which the UE is configured to respond by transitioning from being set to transmit uplink scheduling requests over the second air-interface connection to the second access node to being set to transmit uplink scheduling requests over the first air-interface connection to the first access node.

9. The method of claim 1, wherein the first air-interface connection is defined on a carrier, the method further comprising:
conditioning the reconfiguring of the dual-connectivity service on a determination that uplink load on the carrier is threshold low.

10. A first access node configured to control service of a user equipment device (UE), the first access node comprising:
a wireless communication interface through which the first access node is configured to provide air-interface service;
a network communication interface though which the first access node is configured to communicate on a core network; and
a controller for controlling the service of the UE, wherein the controller is configured to cause the first access node to carry out operations comprising:
detecting that, when the first access node is providing service to the UE over a first air-interface connection concurrently with a second NB providing service to the UE over a second air-interface connection, that quality of the second air-interface connection is less than or equal to a predefined quality threshold, and
responsive to at least the detecting, directing the UE to transition from (i) a first mode in which the UE is set to engage in downlink user-plane communication on both the first and second air-interface connections and uplink user-plane communication on the second air-interface connection but not on the first air-interface connection to (ii) a second mode in which the UE is set to engage in downlink user-plane communication on both the first and second air-interface connections and to engage in uplink user-plane communication on the first air-interface connection but not on the second air-interface connection.

11. The first access node of claim 10, wherein detecting that the quality of the second air-interface connection is less than or equal to the predefined quality threshold comprises detecting that downlink quality of the second air-interface connection is less than or equal to a predefined downlink quality threshold.

12. The first access node of claim 10, wherein detecting that the quality of the second air-interface connection is less than or equal to the predefined quality threshold comprises detecting that uplink quality of the second air-interface connection is less than or equal to a predefined uplink quality threshold.

13. A non-transitory computer-readable medium having encoded thereon program instructions executable by a processing unit to cause a first access node to carry out operations to control dual-connectivity service of a user equipment device (UE) in which the UE is served concurrently by the first access node over a first air-interface connection between the UE and the first access node and by a second access node over a second air-interface connection between the UE and the second access node, the operations comprising:
during the dual-connectivity service, detecting that quality of the second air-interface connection between the UE and the second access node is less than or equal to a predefined quality threshold; and
responsive to at least the detecting, reconfiguring the UE from (i) a first mode in which the UE is set to engage in downlink user-plane communication on both the first and second air-interface connections and uplink user-plane communication on the second air-interface connection but not on the first air-interface connection to (ii) a second mode in which the UE is set to engage in downlink user-plane communication on both the first and second air-interface connections and to engage in uplink user-plane communication on the first air-interface connection but not on the second air-interface connection.

14. The non-transitory computer-readable medium of claim 13, wherein detecting that the quality of the second air-interface connection between the UE and the second access node is less than or equal to the predefined quality threshold comprises detecting that downlink quality of the second air-interface connection between the UE and the second access is less than or equal to a predefined downlink quality threshold.

15. The non-transitory computer-readable medium of claim 14, wherein detecting that the downlink quality of the second air-interface connection between the UE and the second access node is less than or equal to the predefined downlink quality threshold is based on at least one factor selected from the group consisting of (i) a report from the UE of channel quality of the second air-interface connection and (ii) a quantity of retransmission requests for downlink transmission over the second air-interface connection from the second access node to the UE.

16. The non-transitory computer-readable medium of claim 13, wherein detecting that the quality of the second air-interface connection between the UE and the second access node is less than or equal to the predefined quality threshold comprises detecting that uplink quality of the second air-interface connection between the second access node and the UE is less than or equal to a predefined uplink quality threshold.

17. The non-transitory computer-readable medium of claim 16, wherein detecting that the uplink quality of the second air-interface connection between the UE and the second access node is less than or equal to the predefined uplink quality threshold is based on at least one factor selected from the group consisting of (i) evaluation of uplink receive signal quality for transmission from the UE to the second access node on the second air-interface connection, (ii) a quantity of retransmission requests for uplink transmission over the second air-interface connection from the UE to the second access node, and (iii) uplink noise on a carrier on which the second air-interface connection is defined.

18. The non-transitory computer-readable medium of claim 13, wherein detecting by the first access node that the quality of the second air-interface connection between the UE and the second access node is less than or equal to the predefined quality threshold comprises receiving by the first access node from the second access node, over an inter-access-node interface, an indication of the quality of the second air-interface connection.

19. The non-transitory computer-readable medium of claim 13,
  wherein, in the first mode, the UE is set to transmit uplink scheduling requests over the second air-interface connection to the second access node instead of over the first air-interface connection to the first access node, and
  wherein in the second mode, the UE is set to transmit uplink scheduling requests over the first air-interface connection to the first access node instead of over the second air-interface connection to the second access node.

20. The non-transitory computer-readable medium of claim 13, wherein reconfiguring the UE responsive to at least the detecting comprises transmitting from the first access node to the UE over the first air-interface connection a reconfiguration directive to which the UE is configured to respond by transitioning from the first mode to the second mode.

* * * * *